（12） United States Patent
Okuda et al.

(10) Patent No.: US 6,414,452 B1
(45) Date of Patent: Jul. 2, 2002

(54) WAVEFORM CONTROL DEVICE FOR VIBRATING TABLES AND METHOD THEREOF

(75) Inventors: Yukihito Okuda; Akihiro Maekawa; Takaharu Hiroe, all of Hyogo-ken; Makoto Sakuno, Yamaguchi-ken, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 64 days.

(21) Appl. No.: 09/679,491

(22) Filed: Oct. 4, 2000

(30) Foreign Application Priority Data

Oct. 6, 1999 (JP) ............................................. 11-285759

(51) Int. Cl.[7] .............................................. H02K 33/00
(52) U.S. Cl. ........................................ 318/114; 318/128
(58) Field of Search ................................ 318/114, 119, 318/128, 126, 127

(56) References Cited

U.S. PATENT DOCUMENTS 5,883,478 A * 3/1999 Thesling ..................... 318/119

FOREIGN PATENT DOCUMENTS

JP 2001108571 * 3/2001

* cited by examiner

*Primary Examiner*—Nestor Ramirez
*Assistant Examiner*—Judson H. Jones
(74) *Attorney, Agent, or Firm*—Alston & Bird LLP

(57) ABSTRACT

A waveform control unit of a vibrating table comprises: an off-line compensation wave generator which generates an off-line compensation wave on the basis of the inverse characteristic of the vibrating table determined before performing an excitation and a target wave; and an on-line compensation wave generator which generates an on-line compensation wave on the basis of the inverse characteristic of the vibrating table during the excitation determined on the basis of the data of an excitation wave and a reproduced wave during the excitation and the target wave, and it switches the excitation wave to a mixed compensation wave based on the on-line compensation wave from the off-line compensation wave, during the excitation.

19 Claims, 14 Drawing Sheets

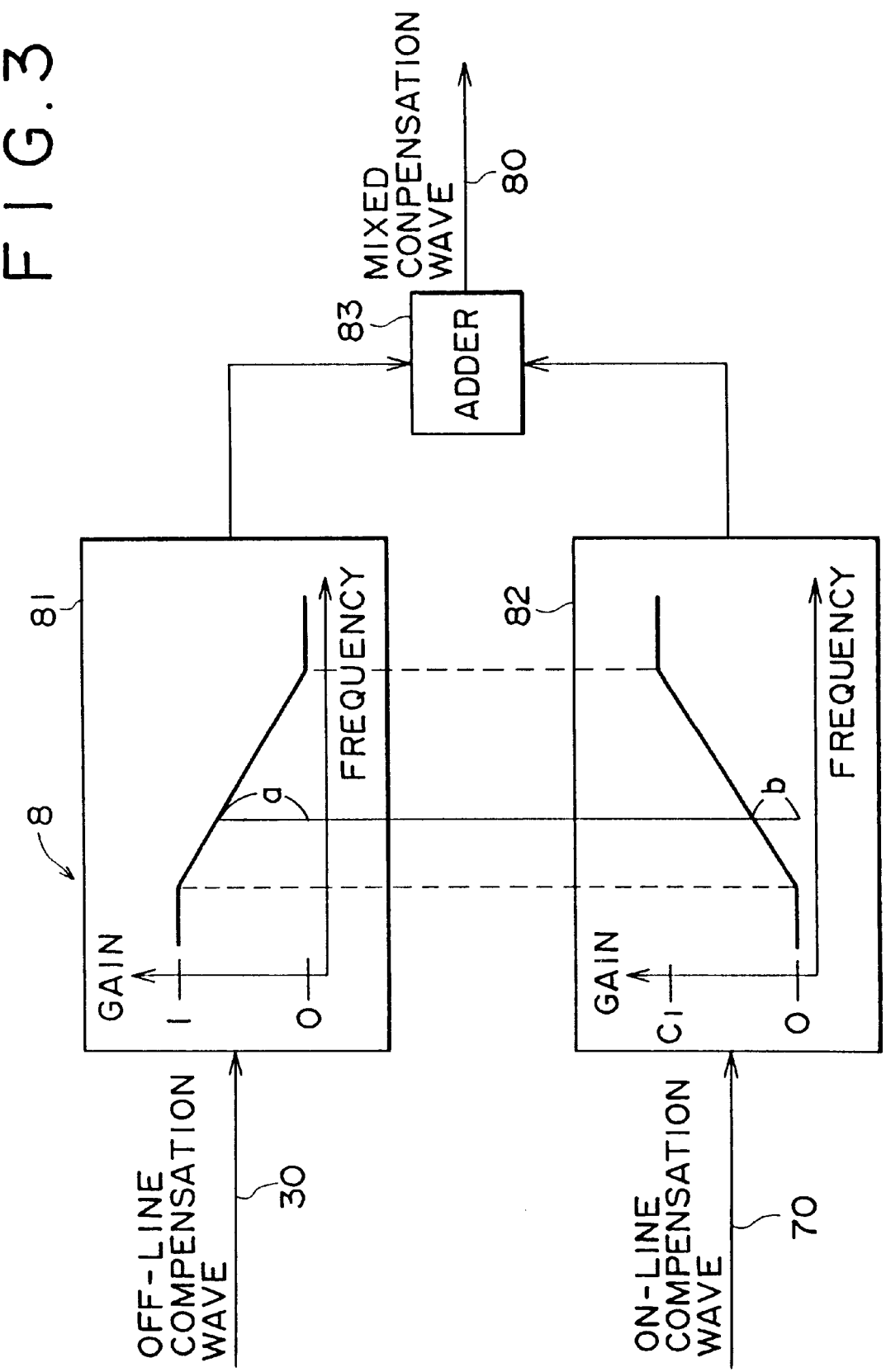

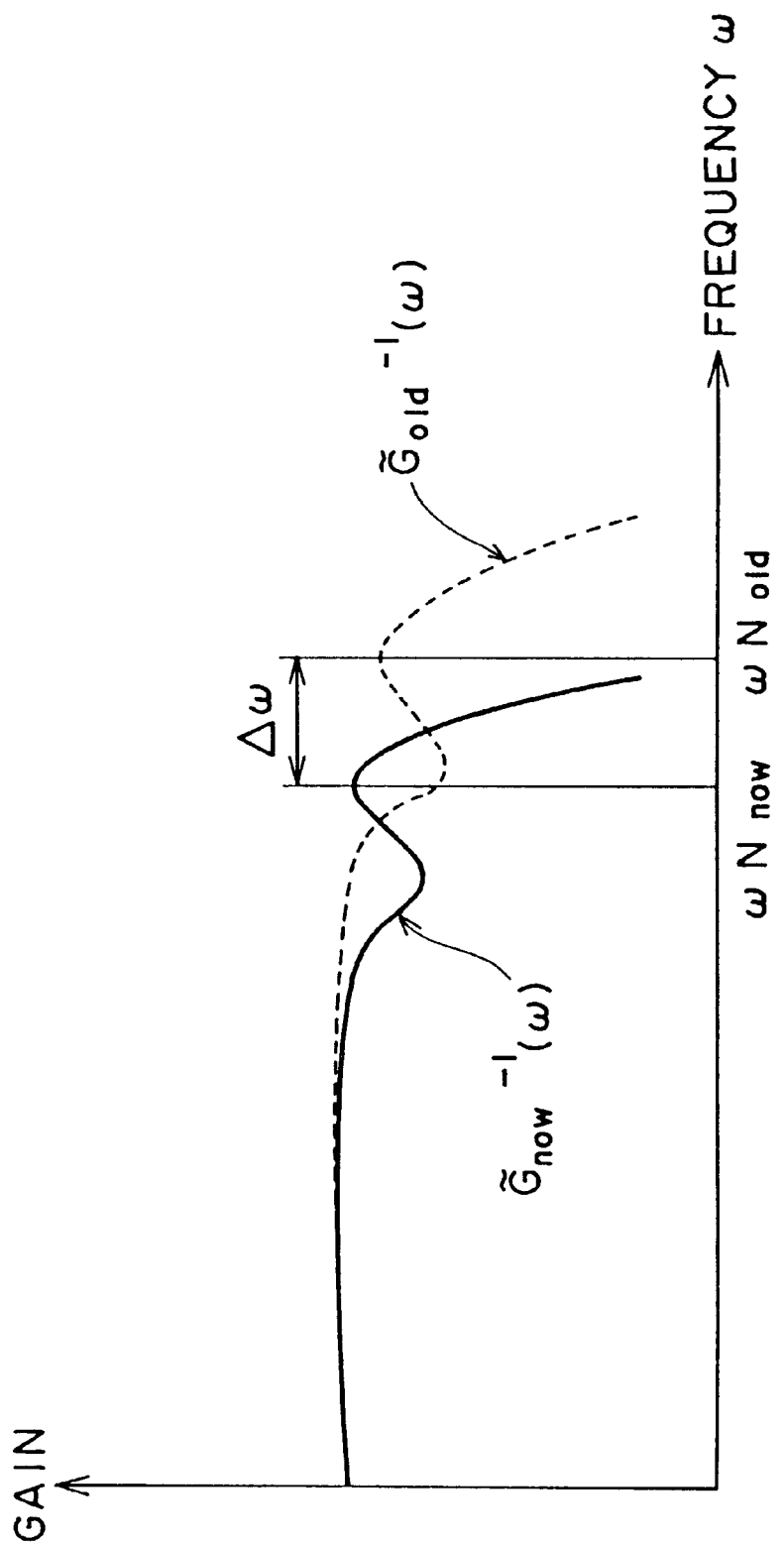

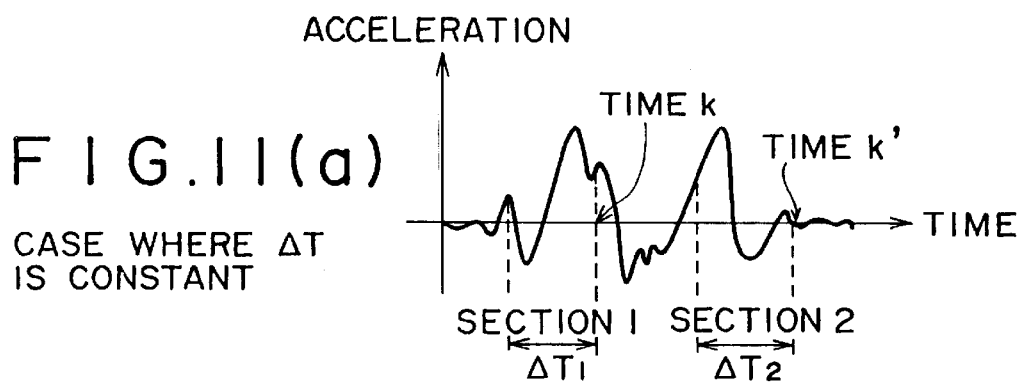
FIG.11(a) CASE WHERE ΔT IS CONSTANT
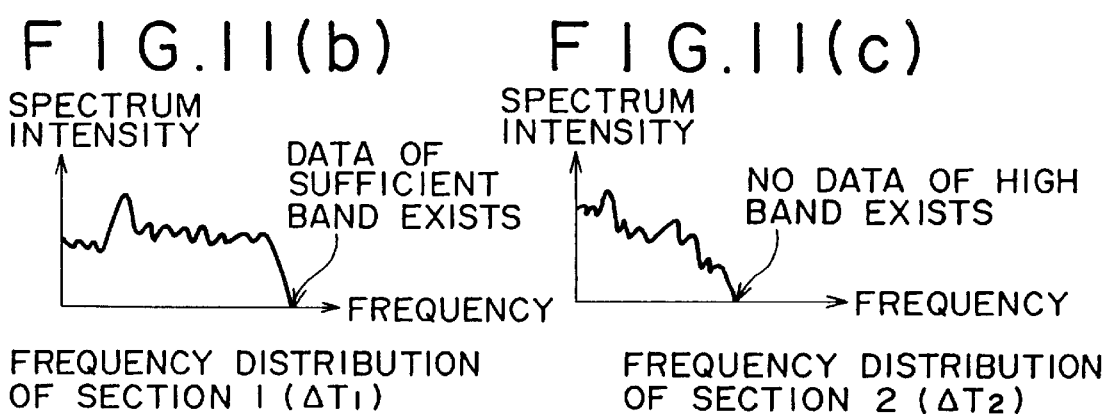
FIG.11(b) FREQUENCY DISTRIBUTION OF SECTION 1 (ΔT1)
FIG.11(c) FREQUENCY DISTRIBUTION OF SECTION 2 (ΔT2)
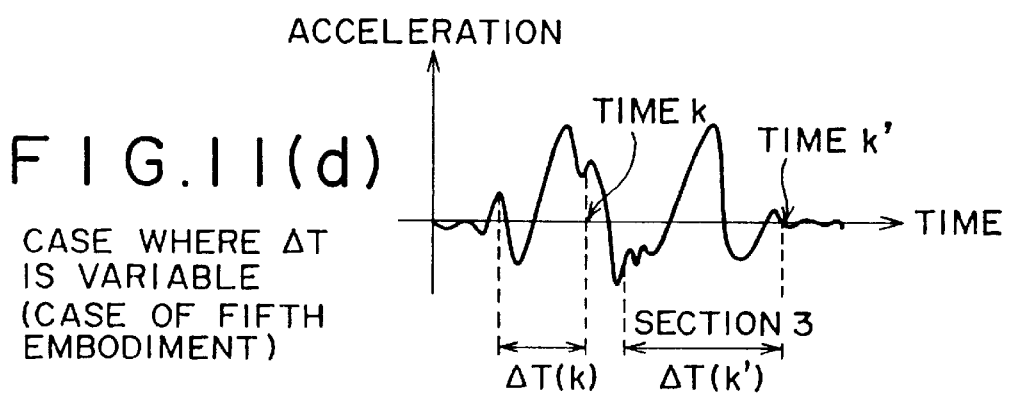
FIG.11(d) CASE WHERE ΔT IS VARIABLE (CASE OF FIFTH EMBODIMENT)
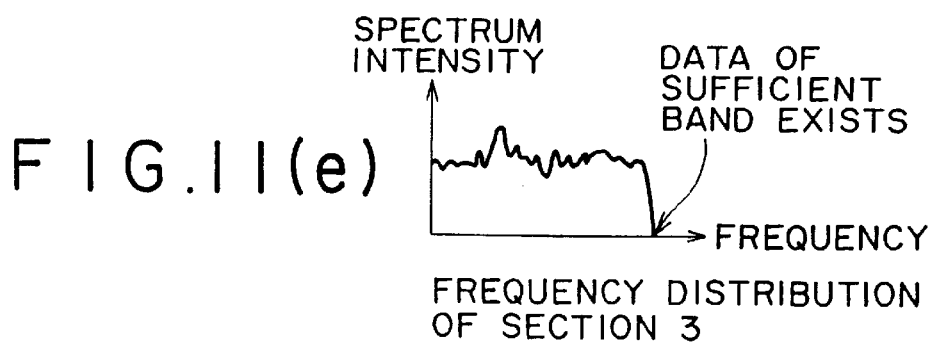
FIG.11(e) FREQUENCY DISTRIBUTION OF SECTION 3

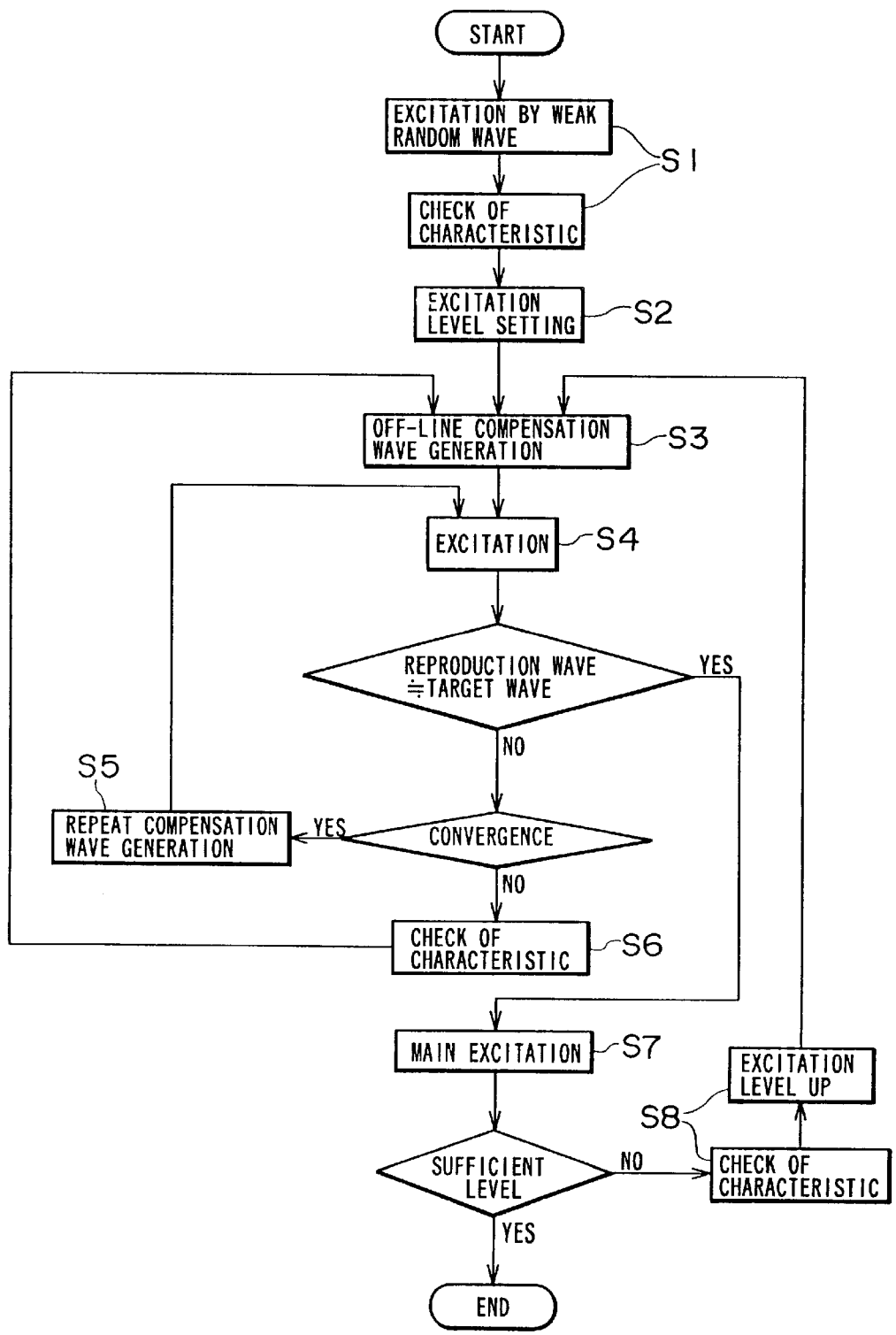

WAVEFORM CONTROL DEVICE FOR VIBRATING TABLES AND METHOD THEREOF

FIELD OF THE INVENTION AND RELATED ART STATEMENT

The present invention is applicable to a vibrating device equipped with a vibrating table and a waveform control unit, and it relates to a real-time adaptive waveform control device and method which can make target waves and reproduced waves coincide with each other by a single excitation.

Previously, in order to examine the behavior, strength or the like of structures during, for example, earthquakes, various types of vibration tests have been performed, and for the purpose thereof, a vibrating unit has been used. FIG. 12 schematically shows the configuration of this type of vibrating unit. This vibrating unit has a vibrating table which vibrates with a test piece 223 of a body to be tested is mounted thereon, and a waveform control unit 100 which controls the waveform of the vibration. Furthermore, the above described vibrating table 2 has a vibrating table control section 21 in which an output signal from the waveform control unit 100 is inputted, an exciting machine 221 into which a control signal from this vibrating table control section 21 is inputted, and a test piece mounting table 222 which is excited by this exciting machine 221. A vibrating table excitation mechanism 22 comprises the exciting machine 221 and the table 222. Thus, the signal of an excitation wave 90 emitted from the waveform control unit 100 is converted into a servo command for operating the exciting machine 221 at the vibrating table control section 21, and the table 222 and the test piece 223 mounted thereon are vibrated by the operation of the exciting machine 221 receiving the servo command signal.

Here, the excitation wave 90 means a waveform of a vibration inputted to the vibrating table 2, and in order to perform a proper vibration test, it is necessary to indicate an excitation wave 90 to the vibrating table 2 so that the test piece 223 may be vibrated by a specific waveform to be realized (target waveform). That is, it is necessary to set the excitation wave 90 to have such a waveform as to make the vibrational waveform (reproduced wave 20) obtained from an acceleration sensor 224 provided on the table 222 and the target wave coincide with each other. The waveform control unit 100 is a unit provided for the purpose of generating such a proper excitation wave 90.

Generally, the correlation between the excitation wave 90 and the reproduced wave 20 can be expressed by the following expression (1) as a function of the frequency ($\omega$):

$$Y(\omega)=G(\omega) \cdot X(\omega) \tag{1}$$

where $Y(\omega)$ expresses the characteristic of a reproduced wave 20, and $X(\omega)$ expresses the characteristic of an excitation wave 90, and $G(\omega)$ expresses the characteristic of a vibrating table 222 including a test piece 223 (hereafter, referred to simply as the characteristic of the vibration table). When this expression (1) is changed into an expression for determining an excitation wave $X(\omega)$, the following expression (2) is found:

$$X(\omega)=G^{-1}(\omega) \cdot Y(\omega) \tag{2}$$

where $G^{-1}(\omega)$ is the inverse characteristic of the vibrating table. In the above described waveform control unit 100, an excitation wave $X(\omega)$ is determined using equation (2) so as to make the reproduced wave $Y(\omega)$ coincide with the target wave. Since the reproduced wave $Y(\omega)$ is set to become the target wave, it is known that a proper excitation wave $X(\omega)$ can be calculated if the inverse characteristic $G^{-1}(\omega)$ of the vibrating table is determined.

However, it is difficult to directly determine this inverse characteristic $G^{-1}(\omega)$ of the vibrating table since it changes with the vibrating table 2 itself, test pieces 223, and the amplitude level of the vibration or the like. Accordingly, usually, some experimental approach is used, in which estimated values $\tilde{G}^{-1}(\omega)$ for the inverse characteristic $G^{-1}(\omega)$, are calculated on the basis of experimental data concerning excitation waves 90 and reproduced waves 20 obtained when the vibrating unit is actually operated. In a conventional vibrating unit, this determination of the inverse characteristic of the vibrating table is not performed during the actual excitation of the vibrating table 2, but it has been performed after the excitation in an off-line manner. In other words, conventionally, the inverse characteristic of a vibrating table are estimated in advance from the data obtained by previous vibration tests or preliminary tests, and the estimated values are used as fixed values in subsequent vibration tests.

FIG. 13 shows a conventional vibrating unit in terms of a waveform control unit 100. In FIG. 13, the parts except the vibrating table 2 form the waveform control unit 100 in FIG. 12. Furthermore, the dotted line in FIG. 13 expresses operations carried out in an off-line manner. At the time of excitation, a target wave 11 emitted from a target wave generator 1 is transmitted to an off-line compensation wave generator 3, and the target wave 11 is compensated by the inverse characteristic of the vibrating table calculated in advance. That is, a proper excitation wave 90 is generated on the basis of the above described expression (2) from the target wave 11 and the inverse characteristic of the vibrating table. Actually, in the above described expression (2), the estimated values $\tilde{G}^{-1}(\omega)$ for the inverse characteristic are used in place of the actual inverse characteristic $G^{-1}(\omega)$ of the vibrating table. Using more precise expressions, the waveform obtained as a result of the compensation done in the off-line compensation wave generator 3 is called an (off-line) compensation wave. In this example, this compensation wave is used as an excitation wave 90 to be transmitted to the vibrating table 2 as it is.

The generated excitation wave 90 is transmitted to the vibrating table as mentioned above, and the vibrating table excitation mechanical section 22 is vibrated under the control of the vibrating table control section 21. Furthermore, the data of the excitation wave 90 during the excitation and the reproduced wave 20 are recorded in an excitation-wave recorder 5 and a reproduced wave recorder 6, respectively. After the end of the excitation, on the basis of this recorded data, with the vibrating table inverse characteristic calculator 4, estimated values 40 [$\tilde{G}^{-1}(\omega)$] of the inverse characteristic of the vibrating table are determined in an off-line manner as mentioned above, and that such values are utilized for future excitation or the like.

Furthermore, in the off-line compensation wave generator 3, the calculation based on the above described expression (2) is performed by a computing unit 32, and a Fourier transform unit 31 and an inverse Fourier transform unit 33 are units which transform the target wave 11 in the time domain into the frequency domain and the compensation wave (excitation wave 90) in the frequency domain into the time domain, respectively.

FIG. 14 is a flow chart in the case where the waveform control unit 100 sown in FIG. 13 is used, and it shows the procedure up to the main excitation (main test) from the identification of the inverse characteristic of the vibrating table. First of all, an excitation by a weak random wave is performed, and from the reproduced wave at that moment, the estimated value $\tilde{G}^{-1}(\omega)$ of the inverse characteristic of in the case where the excitation level (amplitude level of the vibration) is low is determined (step S1 in FIG. 14). Next, the initial excitation level is set (step S2 in FIG. 14), and an excitation is performed by the off-line compensation wave generated by using the determined inverse characteristic $\tilde{G}^{-1}(\omega)$ (steps S3 and S4). Usually, the initial excitation level is set at a low level.

Next, from the result of that excitation, by using a specific method, a repeat compensation wave in which the above described off-line compensation wave is corrected in the direction of making the reproduced wave 20 coincide with the target wave 11 is generated (step S5 in FIG. 14), and an excitation is performed again (step S4 in FIG. 14). This procedure is repeated, and the converging situation of the generated repeat compensation wave is judged. In the case where the repeat compensation wave tends to diverge, the estimated value $\tilde{G}^{-1}(\omega)$ of the inverse characteristic is calculated again from the data at that moment (step S6 in FIG. 14), and redoing is performed from the generation of the off-line compensation wave using that value (step S3 in FIG. 14).

The above described procedure is repeated until the reproduced wave 20 and the target wave 11 coincide with each other sufficiently, and by using the repeat compensation wave at that moment, the main excitation is performed (step S7 in FIG. 14). In this main excitation, in the case where the excitation level has not reached the desired level, the estimated value $\tilde{G}^{-1}(\omega)$ of the inverse characteristic is calculated again on the basis of the result of the excitation at that moment, and the setting of -the excitation level is raised (step S8 in FIG. 14), and the procedure from the generation of the off-line compensation wave (step S3 in FIG. 14) is repeated. As a result of that, if the main excitation is performed at the desired level in a state, the sequential procedure ends.

As described above, in the above described waveform control unit 100, the excitation is repeatedly performed while enlarging the excitation level gradually, and by using those results, such the inverse characteristic that would make the reproduced wave 20 and the target wave 11 coincide with each other sufficiently at an excitation level necessary in the main excitation is determined in the off-line mode.

However, recently, a vibrating unit for performing a so-called single shot breakdown test in which a breakdown of a building at the time of occurrence of a big earthquake or the like is supposed is desired. This single shot breakdown test is a test in which a vibration of a high excitation level is given to a large-sized test piece such as a building in a short time to break down the test piece. Therefore, it is impossible to repeat the test under the same condition, and further, the characteristic of the vibrating table changes on occasion because of the breakdown of the test piece during one excitation. Accordingly, a plurality of times of excitations are necessary for the identification of the characteristic of the vibrating table like the waveform control unit in the above described vibrating unit, and further, there is such a problem that it is impossible for a waveform control unit fixedly using the previously determined characteristic of the vibrating table during the excitation to comply with a single shot breakdown test like this.

OBJECT AND SUMMARY OF THE INVENTION

Therefore, it is a main object of the present invention to provide a waveform control unit of a vibrating table which can make a target wave and a reproduced wave coincide with each other by one excitation and which can be applied to a vibration test such as a so-called single shot breakdown test where the characteristic of the vibrating table changes during the excitation, and a method thereof.

In order to attain the above described object, one side view of the present invention is a waveform control unit of a vibrating table, in which the excitation wave is switched by turns to the compensation wave determined on the basis of the inverse characteristic of the vibrating table at that moment, that is, in which a so-called on-line compensation is performed. Therefore, according to the present invention, it is possible to make a target wave and a reproduced wave coincide with each other by one excitation, and it is possible to be applied to a vibration test such as a so-called single shot breakdown test where the characteristic of the vibrating table changes during the excitation.

In order to attain the above described object, another side view of the present invention is a waveform control unit of a vibrating table which gives such a signal of an excitation wave as to make a reproduced wave reproduced in a vibration table during the excitation coincide with the target wave, to the above described vibrating table, comprising an off-line compensation wave generator which generates an off-line compensation wave to be the above described excitation wave, on the basis of the inverse characteristic of the above described vibrating table determined before performing the excitation and the above described target wave, and anon-line compensation wave generator which generates an on-line compensation wave to be the above described excitation wave ,on the basis of the above described inverse characteristic of the vibrating table during the excitation determined on the basis of the data of the above described excitation wave and the above described reproduced wave for a specific time during the excitation and the above described target wave, wherein during the excitation, the above described excitation wave to be given to the above described vibrating table is switched to a compensation wave based on the above described on-line compensation wave from the above described off-line compensation wave.

Furthermore, in the above described invention, a preferred embodiment thereof is a waveform control unit of a vibrating table, wherein the above described on-line compensation wave generator generates the above described new on-line compensation waves by turns during the above described excitation and the switching of the above described excitation wave to the compensation wave on the basis of the on-line compensation wave is performed by turns on the basis of the above described newly generated online compensation wave.

Furthermore, in the above described invention, another embodiment is a waveform control unit of a vibrating table, further comprising an adder for each frequency which adds the above described off-line compensation wave and the above described on-line compensation wave at a specific rate corresponding to the frequency and which generates such a mixed compensation wave as to be the above described off-line compensation wave in the low frequency domain and to be the above described on-line compensation wave in the high frequency domain, wherein the compensation wave based on the above described on-line compensation wave is the above described mixed compensation wave.

Still furthermore, in the above described invention, another embodiment is a waveform control unit of a vibrating table, further comprising a compensation wave switching unit for generating the above described excitation wave after switching by adding a compensation wave which has become the above described excitation wave before switching and a compensation wave which becomes the above described excitation wave after switching at a specific rate corresponding to the time after switching so that the above described excitation wave may smoothly be shifted to the waveform after switching from the waveform before switching when switching the above described excitation wave.

Furthermore, in the above described invention, another embodiment is a waveform control unit of a vibrating table, wherein the switching of the above described excitation wave is performed at a previously set timing before the above described excitation.

Still furthermore, in the above described invention, another embodiment is a waveform control unit of a vibrating table, wherein the switching of the above described excitation wave is performed for each constant time during the above described excitation.

Still furthermore, in the above described invention, another embodiment is a waveform control unit of a vibrating table, wherein the switching of the above described excitation wave is performed when a gain difference between the newest inverse characteristic of the vibrating table during the above described excitation and the above described inverse characteristic of the vibrating table used for generating the compensation wave which has become the above described excitation wave at that moment exceeds a specific value.

Still furthermore, in the above described invention, another embodiment is a waveform control unit of a vibrating table, wherein the switching of the above described excitation wave is performed when a difference of eigenvalues of the respective test pieces mounted on the above described vibrating table determined from each of the newest inverse characteristic of the vibrating table during the above described excitation and the inverse characteristic of the above described vibrating table used for generating the compensation wave which has become the above described excitation wave at that moment exceeds a specific value.

Still furthermore, in the above described invention, another embodiment is a waveform control unit of a vibrating table, wherein the above described specific time when the data of the above described excitation wave and reproduced wave used for determining the above described inverse characteristic of the vibrating table during the excitation is obtained is set in advance to such a time as to be able to obtain the data with no bias in the frequency component for each time during the above described excitation.

In order to attain the above described object, another side view of the present invention is a vibrating unit comprising a vibrating table where a test piece of a body to be tested is mounted and the above described test piece is vibrated by a specific waveform, and a waveform control unit of the above described vibrating table, wherein the above described waveform control unit of the vibrating table is a waveform control unit of a vibrating table according to the above described invention or embodiments thereof.

In order to attain the above described object, another side view of the present invention is a waveform control method of a vibrating table which receives such a signal of an excitation wave as to make the reproduced wave coincide with the target wave during excitation and vibrates, comprising a first step of generating an off-line compensation wave to be the above described excitation wave on the basis of the inverse characteristic of the above described vibrating table determined before performing the excitation and the above described target wave and of making the above described excitation wave be the above described off-line compensation wave, and a second step of generating an on-line compensation wave to be the above described excitation wave on the basis of the above described inverse characteristic of the vibrating table during the excitation determined on the basis of the data of the above described excitation wave and the above described reproduced wave for a specific time during the excitation and the above described target wave and of switching the above described excitation wave to a compensation wave based on the above described on-line compensation wave during the excitation.

Still more objects and features of the present invention will be apparent from the embodiments of the invention described below.

BRIEF DESCRIPTION OF THE DRAWINGS

FIG. 3 is a figure showing one example of the processing in an adder 8 for each frequency;

FIG. 10 is a figure showing the difference between an eigenvalue and an eigenvalue;

FIGS. 11(a)–11(e) are figures for explaining the data acquisition term ΔT;

FIG. 14 is a flow chart in the case where a conventional waveform control unit is used.

DETAILED DESCRIPTION OF PREFERRED BODIMENTS

Figure 1:
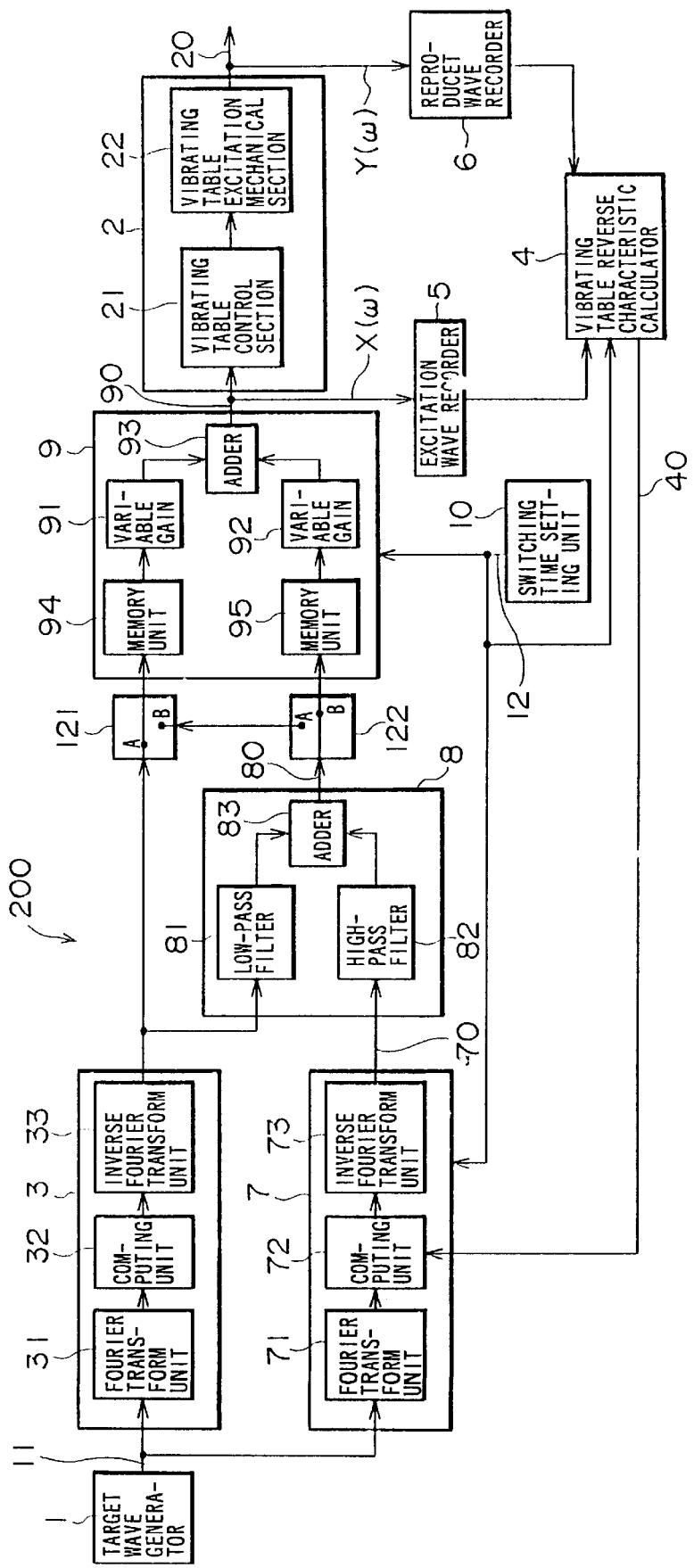
FIG. 1 is a block diagram according to a first embodiment of a waveform control unit to which the present invention is applied.

Preferred embodiments of the present invention will be described below by referring to drawings. However, these embodiments do not limit the technical range of the present invention. By the way, in the figures, the description will be given by attaching the same reference numerals or reference characters to the same or similar objects.

FIG. 1 is a block diagram showing a first embodiment of a wave form control unit to which the present invention is applied. A wave form control unit 200 according to the first embodiment is a unit in which at each time during the excitation previously set before the excitation, the inverse characteristic of a vibrating table at that moment is determined and the excitation wave is switched to a compensation wave generated on the basis of that inverse characteristic. That is, it is a unit in which the on-line compensation is performed at each set time during the excitation.

Figure 13:
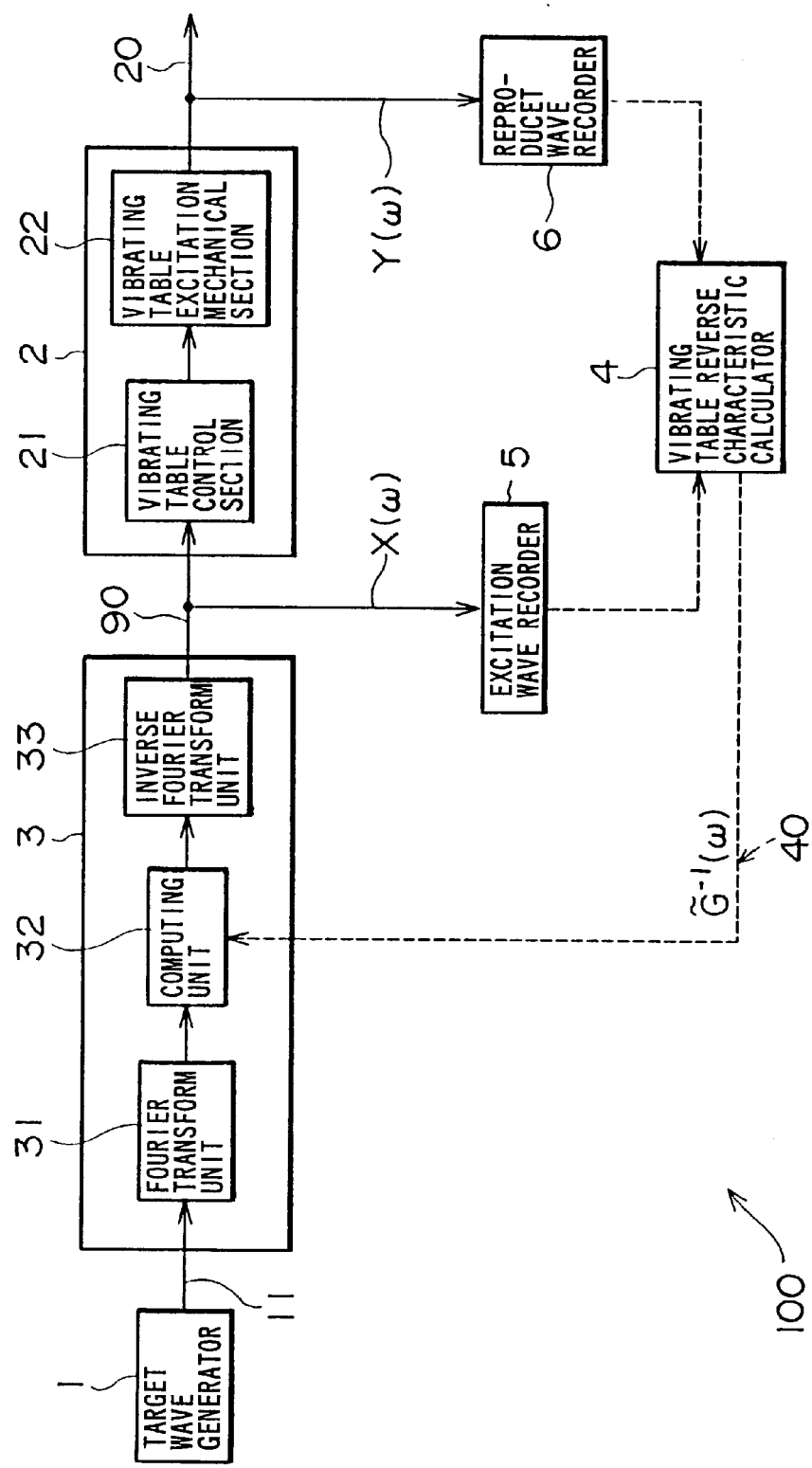
FIG. 13 is a figure showing the configuration of a conventional vibrating unit with priority given to a waveform control unit.

As shown in FIG. 1, the wave form control unit 200 according to the first embodiment is configured such that an on-line compensation wave generator 7, an adder 8 for each frequency, a compensation wave switching unit 9, a switching time setting unit 10, and switching units 121, 122 are added to the waveform control unit 100 described on the basis of FIG. 13.

Figure 2:
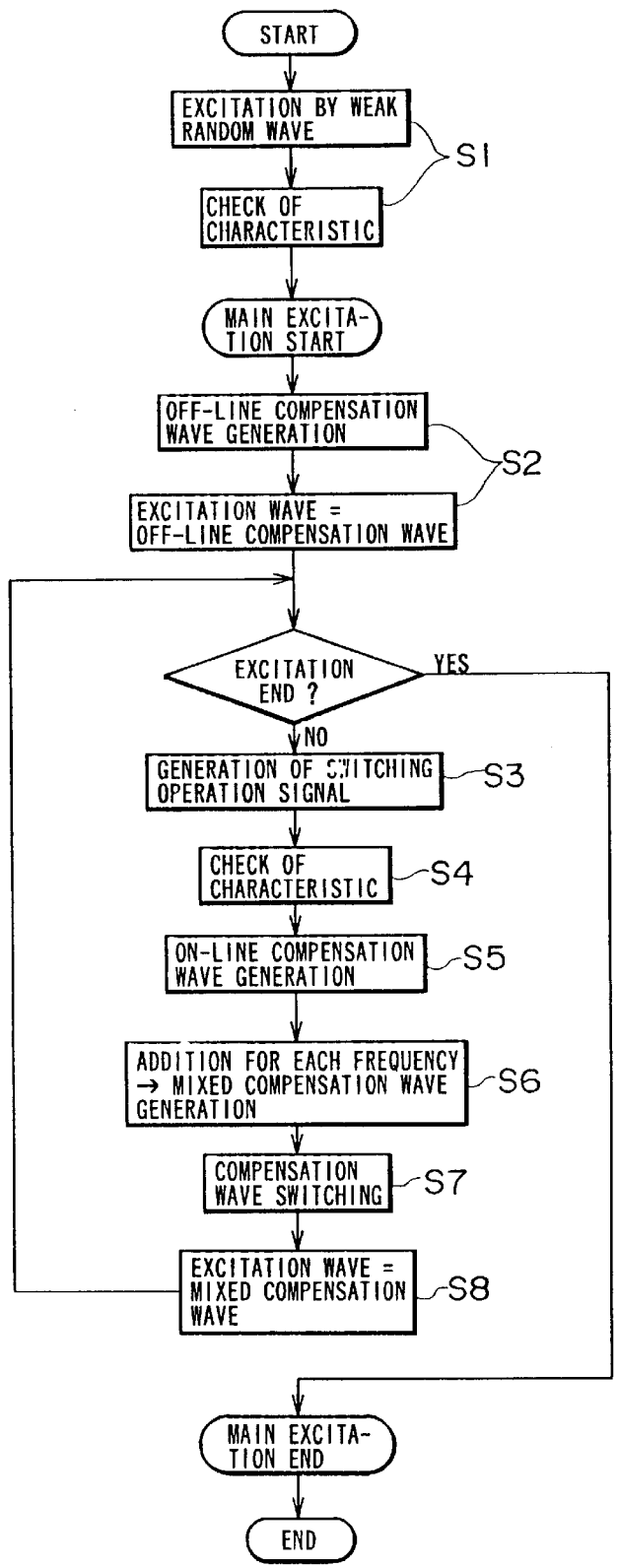
FIG. 2 is a flow chart according to the first embodiment.

FIG. 2 is a flow chart of the waveform control unit 200 shown in FIG. 1. The procedure of excitation and the function of each section in the first embodiment will be described below on the basis of FIG. 1 and FIG. 2.

First, before performing the main excitation, similarly to the procedure described in the previously mentioned related art, an excitation by a weak random wave is performed, and the estimated value $\tilde{G}^{-1}(\omega)$ of the inverse characteristic of the vibrating table obtained from that result is determined in advance (step S1 in FIG. 2). After that, the main excitation is started, and first, by using the inverse characteristic obtained from the above described weak random wave, an off-line compensation wave 30 is generated in an off-line compensation wave generator 3. At the early stage of the main excitation, this off-line compensation wave 30 becomes an excitation wave 90 transmitted to the vibrating table as it is, and the vibrating table 2 is made to vibrate (step S2 in FIG. 2). The operation of each section up to this point is the same as the content described in the previously mentioned related art. Until a switching operation signal 12 is emitted from the switching time setting unit 10, this state is continued.

The switching time setting unit 10 is a unit which emits a switching operation signal 12 so that the above described on-line compensation may be performed to switch the excitation wave 90, and in the first embodiment, the time to output this switching operation signal 12 is set in advance according to the amplitude level of the target wave 11 before the excitation. When a switching operation signal 12 is emitted from the switching time setting unit 10 (step S3 in FIG. 2), the estimated value 40 of the inverse characteristic of the vibrating table at that moment is determined in a vibrating table inverse characteristic calculator 4 from the data of the excitation wave 90 and the reproduced wave 20 recorded in an excitation wave recorder 5 and a reproduced wave recorder 6 (step S4 in FIG. 2). Here, the excitation wave recorder 5 and the reproduced wave recorder 6 are the same as those described in the previously mentioned related art, and they store the data of the excitation wave 90 and the reproduced wave 20 for the past specific time ($\Delta T$).

Furthermore, the vibrating table inverse characteristic calculator 4 is also the same as that described in the previously mentioned related art, but since the data of the excitation wave 90 and the reproduced wave 20 used for determining the inverse characteristic is a short data obtained within the above described past specific time ($\Delta T$), the AR model which is a well known method is used as the algorithm for calculating the inverse characteristic. That method is shown below.

The AR model is expressed by the following expression (3):

$$X(kT) = \sum_{m=1}^{M} A(m) \cdot X((k-m)T) + U(kT) \quad (3)$$

Here, in the case of a single axis vibrating table, it is possible to be expressed by a two-variable model of the target wave-input and the reproduced wave-output, and therefore, X(kT), A(m), and U(kT) are as follows. In the case of a three-dimensional vibrating table, the target wave and the reproduced wave have the component in each axial direction, and therefore, the number of variables is 3 or more, but the method described below is the same.

$$X(kT) = \begin{bmatrix} y(kT) \\ x(kT) \end{bmatrix}$$

A(m)=2×2 AR modular matrix $$U(kT) = \begin{bmatrix} u_y(kT) \\ u_x(kT) \end{bmatrix} : \text{residual vector}$$

Where x(kT) and y(kT) are the excitation wave and the reproduced wave which are expressed by the time domain, respectively.

By using this model, the AR modular matrix is identified, and the order thereof is determined by giving the minimum value of the following expression (4) called [FPE discipline of AKAIKE].

$$FPE(M) = \left(1 + \frac{2M+1}{N}\right) \times \left(1 + \frac{2M+1}{N}\right)^{-1} \cdot E\{u_y^2(kT)\} \quad (4)$$

Here, N expresses the number of pieces of data of the sample excitation waves and reproduced waves, and k takes values of 1, 2, 3, ..., N.

Next, after calculating the Fourier transform B($\omega$) of the AR modular matrix A($\omega$), the spectral density matrix C($\omega$) is determined by the following expression (5):

$$C(\omega) = \begin{bmatrix} c_{yy}(\omega) & c_{yx}(\omega) \\ c_{xy}(\omega) & c_{xx}(\omega) \end{bmatrix} \quad (5)$$

$$= B^{-1}(\omega) \cdot E\{U(kT) \cdot U^t(kT)\}\{B*(\omega)\}^{-1}$$

Here, E { } expresses the expected value calculation, and t expresses the transposed matrix, and expresses the conjugate transposed matrix. Consequently, the estimated value $\tilde{G}^{-1}(\omega)$ of the inverse characteristic of the vibrating table can be determined by the following expression (6).

$$\tilde{G}^{-1}(\omega) = \left(\frac{c_{xy}(\omega)}{c_{xx}(\omega)}\right)^{-1} \quad (6)$$

Furthermore, it is also possible to employ a unit which uses a method other than the AR model as the calculating method of the inverse characteristic of a vibrating table.

As mentioned above, when a inverse characteristic is calculated in the vibrating table inverse characteristic calculator 4, an on-line compensation wave 70 using that inverse characteristic is generated in the on-line compensation wave generator 7 replying the switching operation signal 12 from the switching time setting unit 10 (step S5 in FIG. 2). The structure of the on-line compensation wave generator 7 is the same as that of the off-line compensation wave generator 3, and it comprises a Fourier transform unit 71, a computing unit 72, and an inverse Fourier transform unit 73, and for the generation of a compensation wave in the computing unit 72, the above described expression (2) is used. Accordingly, the on-line compensation wave generator 7 is different from the off-line compensation wave generator 3 only in that the estimated value of the inverse characteristic used for generating a compensation wave changes during the excitation.

Next, the generated on-line compensation wave 70 is transmitted to the adder 8 for each frequency, and the addition with the off-line compensation wave 30 depending on the frequency is performed (step S6 in FIG. 2).

As mentioned above, the estimated value 40 of the inverse characteristic used for generating the on-line compensation wave 70 is determined from the data of a short time (ΔT), and therefore, the accuracy in the low frequency domain is lower than that of the inverse characteristic in the off-line determined from the data of the total of one excitation. Therefore, a processing is performed, in which the off-line compensation wave 30 from the off-line compensation wave generator 3 and the on-line compensation wave 70 from the on-line compensation wave generator 7 are added after passing them through a low-pass filter 81 and a high-pass filter 82, respectively.

FIG. 3 is a figure showing one example of the processing in the adder 8 for each frequency. As shown in the figure, the low-pass filter 81 and the high-pass filter 82 are filters in which the rate (gain: 0 to 1) at the time of addition of the off-line compensation wave 30 and the online compensation wave 70 is set for each frequency. From the above described reason, the setting is made such that only the off-line compensation wave 30 is used in the area where the frequency is sufficiently low and only the on-line compensation wave 70 is used in the area where the frequency is sufficiently high, and that both are mixed in the boundary area thereof. In the example of FIG. 3, the relation between the frequency and the gain is linear in the above described boundary area, but it is unnecessary to be linear as long as the relation is a relation where the sun of the gains (a+b in FIG. 3) in the low-pass filter 81 and the high-pass filter 82 is 1 for each frequency.

The result of the addition in the adder 8 for each frequency is the mixed compensation wave 80 to be switched as the excitation wave 90 replying the above described switching operation signal 12, and it is transmitted to the compensation wave switching unit 9 through a switching unit 122. The switching unit 122 is switched for each of the above described switching operation signals 12, and it outputs the mixed compensation wave 80 generated in the adder 8 for each frequency to a memory unit 94 or a memory unit 95 alternately (step S7 in FIG. 2). On the other hand, the switching unit 121 is a switch for switching use/nonuse of the on-line compensation wave 70, and it is set on the terminal A side in the case just after the start of excitation or the like when the on-line compensation wave 70 is not used, and it is set on the terminal B side in the case when the on-line compensation wave 70 is used. Accordingly, it is switched to the terminal B side from the terminal A side at the time when the first switching operation signal 12 is emitted.

The compensation wave switching unit 9 switches the excitation wave 90 to be outputted to the vibrating table 2, replying the switching operation signal 12 from the switching time setting unit 10, to the mixed compensation wave 80 generated in the adder 8 for each frequency by being on-line-compensated, and at that moment, it performs the processing so that the- excitation wave 90 may smoothly be switched to the new mixed compensation wave 80.

In the memory units 94, 95, a mixed compensation wave 80 which has been outputted as the excitation wave 90 before the switching and a mixed compensation wave 80 which is generated by the switching operation signal to be the excitation wave 90 after the switching are recorded, respectively. After the start of the excitation, at the time when the first switching operation signal 12 has been emitted, an off-line compensation wave 30 generated in the above described off-line compensation wave generator 3 is stored in the memory unit 94 and a mixed compensation wave 80 generated in the adder 8 for each frequency is stored in the memory unit 95. When a switching operation signal is emitted from the second signal onward, the new and old mixed compensation waves 80 are stored in two memory units alternately on the basis of the operation of the above described switching unit 122.

Figure 4A:
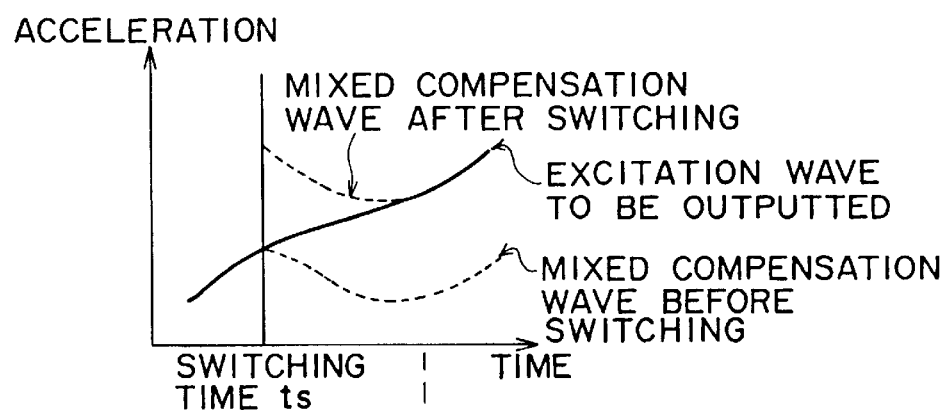
FIGS. 4(a) and 4(b) are figures for explaining the processing in variable gains 91, 92 and an adder 93.
Figure 4B:
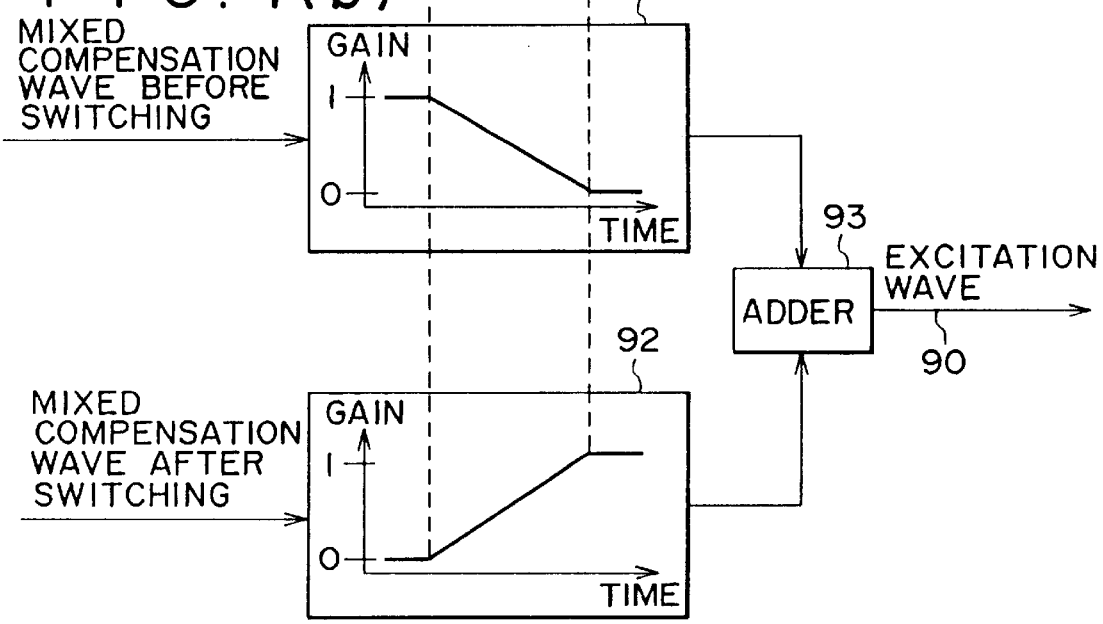

The stored new and old mixed compensation waves 80 are added in an adder 93 after specific gain values have been given to them in variable gains 91, 92, respectively, and a new excitation wave 90 to be outputted to the vibrating table 2 is generated (step S8 in FIG. 2). FIG. 4 is a figure for explaining the processing in the variable gains 91, 92 and the adder 93. FIG. 4 (A) expresses the waveforms of the new and old mixed compensation waves 80 and the excitation wave 90 outputted from the adder 93. Furthermore, FIG. 4 (B) expresses the change of the gains in the variable gains 91, 92. As known from the figure, for a time Δt (within a specific time) since the switching time $t_s$ (time when the above described switching operation signal is emitted), the new and old mixed compensation waves 80 are mixed on the basis of the change of the gain, and as shown in FIG. 4(A), the excitation wave 90 to be outputted smoothly changes so that it may interpolate the waveforms of the new and old compensation waves. Consequently, the bad effect caused by the intermittent change at the time of switching can be prevented.

Returning to FIG. 1, the new excitation wave 90 outputted from the compensation wave switching unit 9 is transmitted to the vibrating table 2, and the vibration caused by this excitation wave 90 is continued until the next switching operation signal 12 is emitted. Each time a switching operation signal 12 is emitted from the switching time setting unit 10, the operations from the inverse characteristic grasping in the above described vibrating table inverse characteristic calculator 4 (steps S3 to S8 in FIG. 2) are performed, and they are repeated until the end of the main excitation.

As described above, at each time set in advance, the waveform control unit according to the first embodiment grasps the inverse characteristic of the vibrating table at that moment, and by using the compensation wave on-line-compensated on the basis of the inverse characteristic as the excitation wave on demand, it is possible to make the target wave and the reproduced wave coincide with each other by one excitation. Furthermore, the off-line compensation wave is used in the low frequency domain where the error is large in the on-line compensation mode, and the new and old compensation waves are smoothly switched when switching the compensation wave, and consequently, a more proper vibration test can be performed.

Next, a second embodiment of the present invention will be described. The wave form control unit according to the second embodiment is approximately the same as the unit of the first embodiment, but it is a unit, wherein the grasping calculation of the inverse characteristic of the vibrating table is performed at all times and an on-line compensation wave is generated to switch the compensation wave when the change of the gain of the inverse characteristic becomes larger than a specific value.

Figure 5:
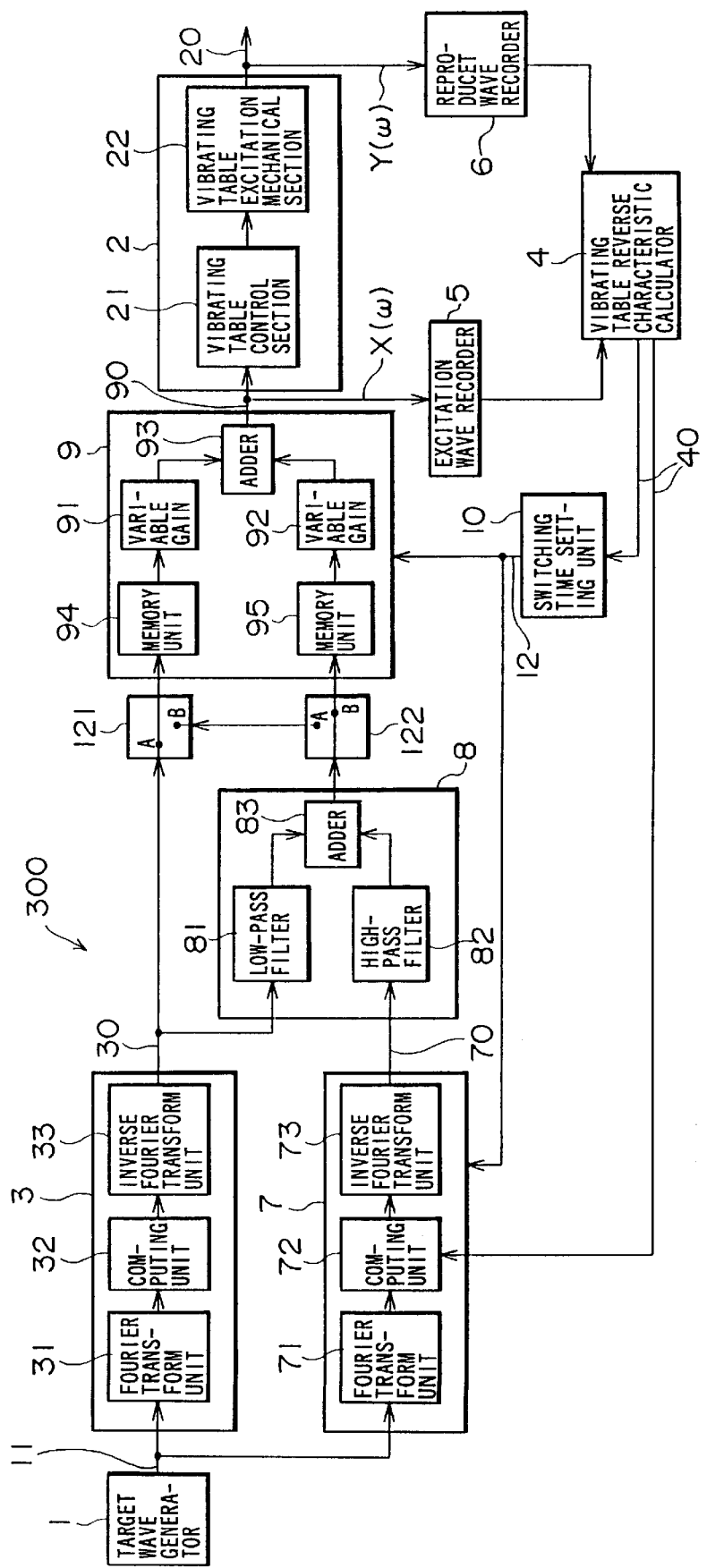
FIG. 5 is a block diagram of a waveform control unit according to a second embodiment.
Figure 6:
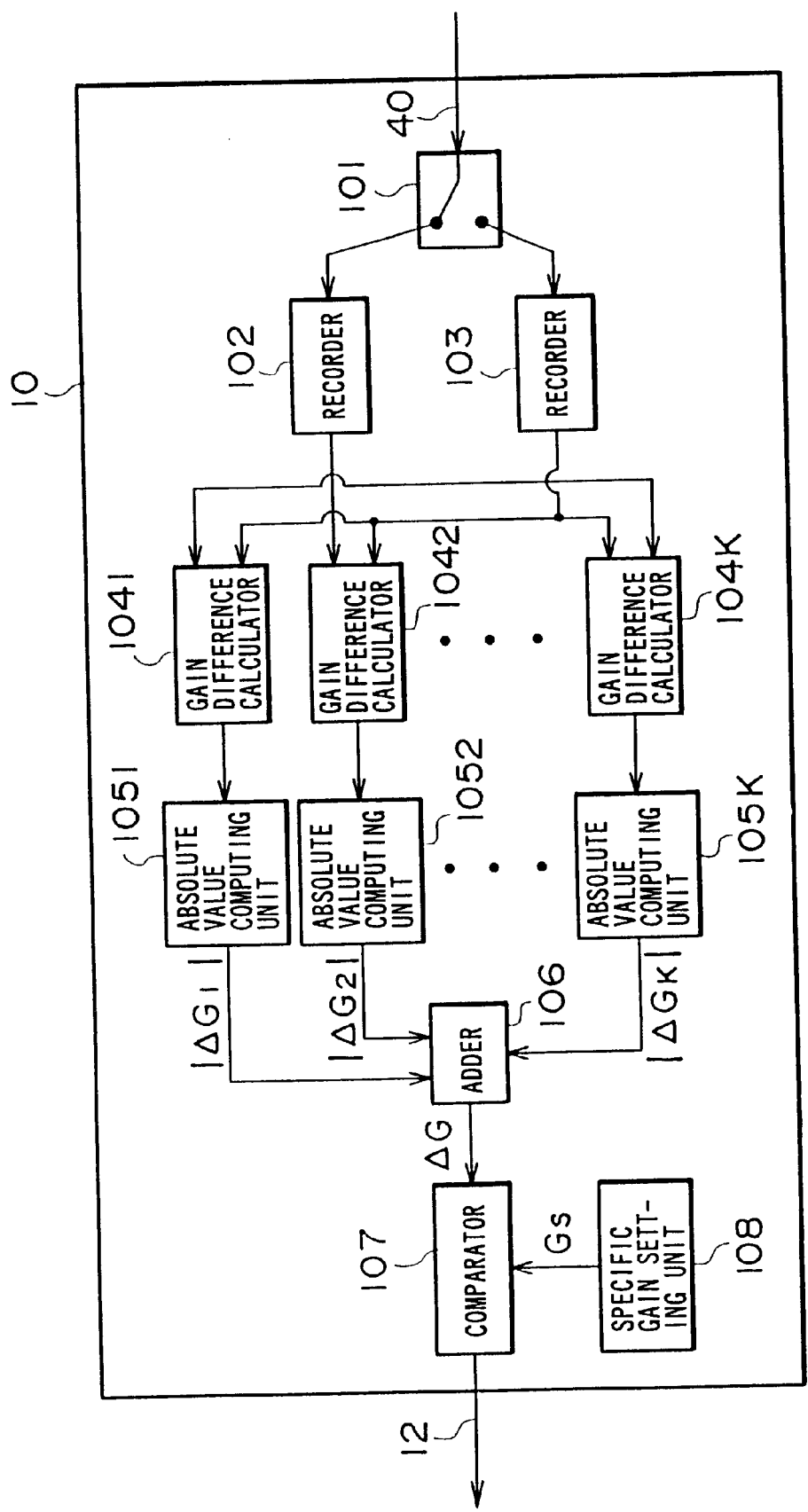
FIG. 6 is a block diagram of a switching time setting unit 10 according to the second embodiment.
Figure 7:
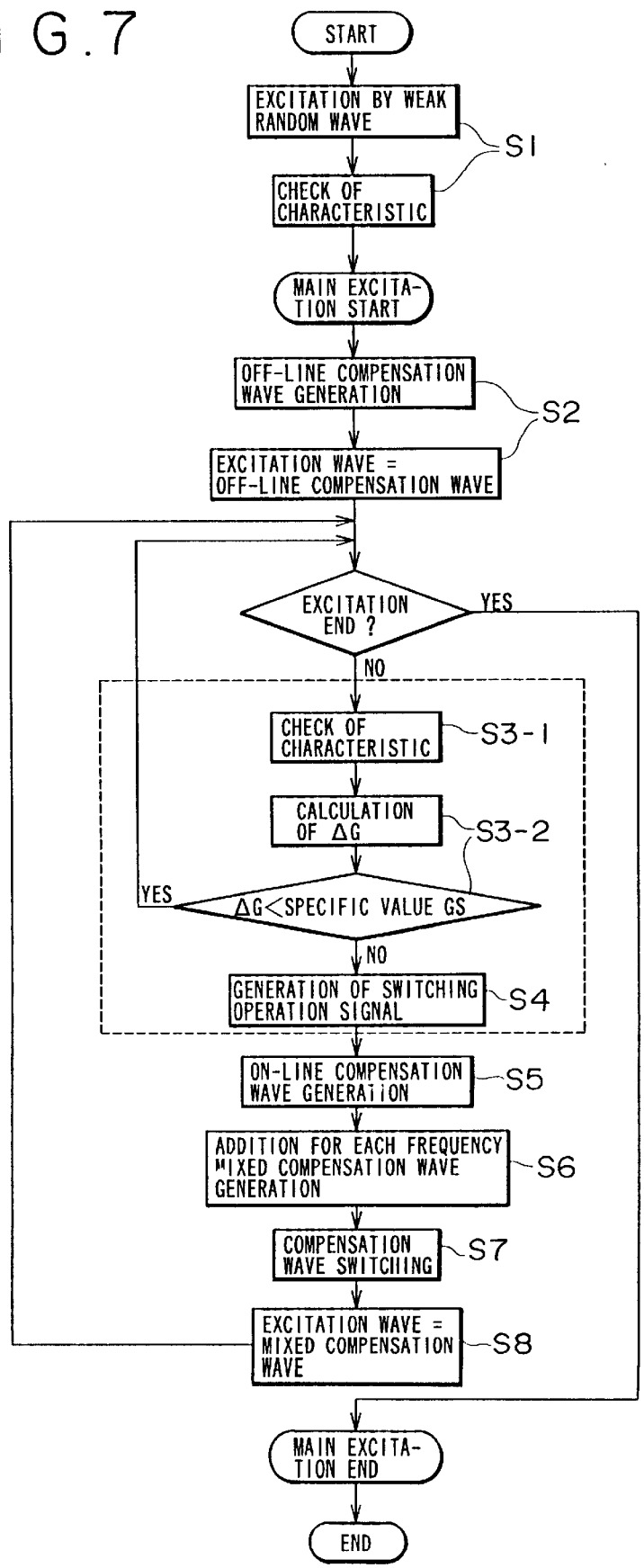
FIG. 7 is a flow chart according to the second embodiment.

FIG. 5 is a block diagram of a waveform control unit 300 according to the second embodiment. It is different from the block diagram of the first embodiment shown in FIG. 1 only in the direction of the signal between the vibrating table inverse characteristic calculator 4 and the switching time setting unit 10, and further, the configuration of each section is also the same except for the switching time setting unit 10. FIG. 6 is a block diagram of the switching time setting unit 10 in the second embodiment. Furthermore, FIG. 7 is a flow chart in the second embodiment. In FIG. 7, the part enclosed by the dotted line, in other words, the part related to the characteristic grasping in the vibrating table inverse characteristic calculator 4 and the generation of the switching operation signal 12 in the switching time setting unit 10 is the part different from that of the first embodiment.

The contents different from those of the first embodiment will be described below on the basis of FIG. 6 and FIG. 7. Unlike that in the case of the first embodiment, the vibrating table inverse characteristic calculator 4 does not perform the calculation of the inverse characteristic by the switching operation signal 12 from the switching time- setting unit 10, but it performs the calculation of the inverse characteristic at all times (or for each specific sampling time) during the excitation, and it outputs that result to the on-line compensation wave generator 7 and the switching time setting unit 10 (step S3-1 in FIG. 7). Furthermore, the calculation itself of the inverse characteristic is performed by using the AR model similarly to the first embodiment, and by using the data for the above described $\Delta T$ from the excitation wave recorder 5 and the reproduced wave recorder 6.

The switching time setting unit 10 receiving the inverse characteristic outputs a switching operation signal 12 when the difference between the inverse characteristic corresponding to the present excitation wave and the inverse characteristic determined during the excitation becomes larger than a certain value. More specifically, the estimated vale $\tilde{G}_{old}^{-1}(\omega)$ of the inverse characteristic which has been used for generating the compensation wave used as the excitation wave at present and the estimated value $\tilde{G}_{now}^{-1}(\omega)$ of the inverse characteristic which has been sent this time are compared at K pieces of previously set frequency values, and the sum total of absolute values of the differences of gains thereof is calculated. Then, the calculated value is compared with the previously set specific value (step S3-2 in FIG. 7), and in the case where the calculated value is larger, a switching operation signal 12 is generated (step S4 in FIG. 7).

Figure 8:
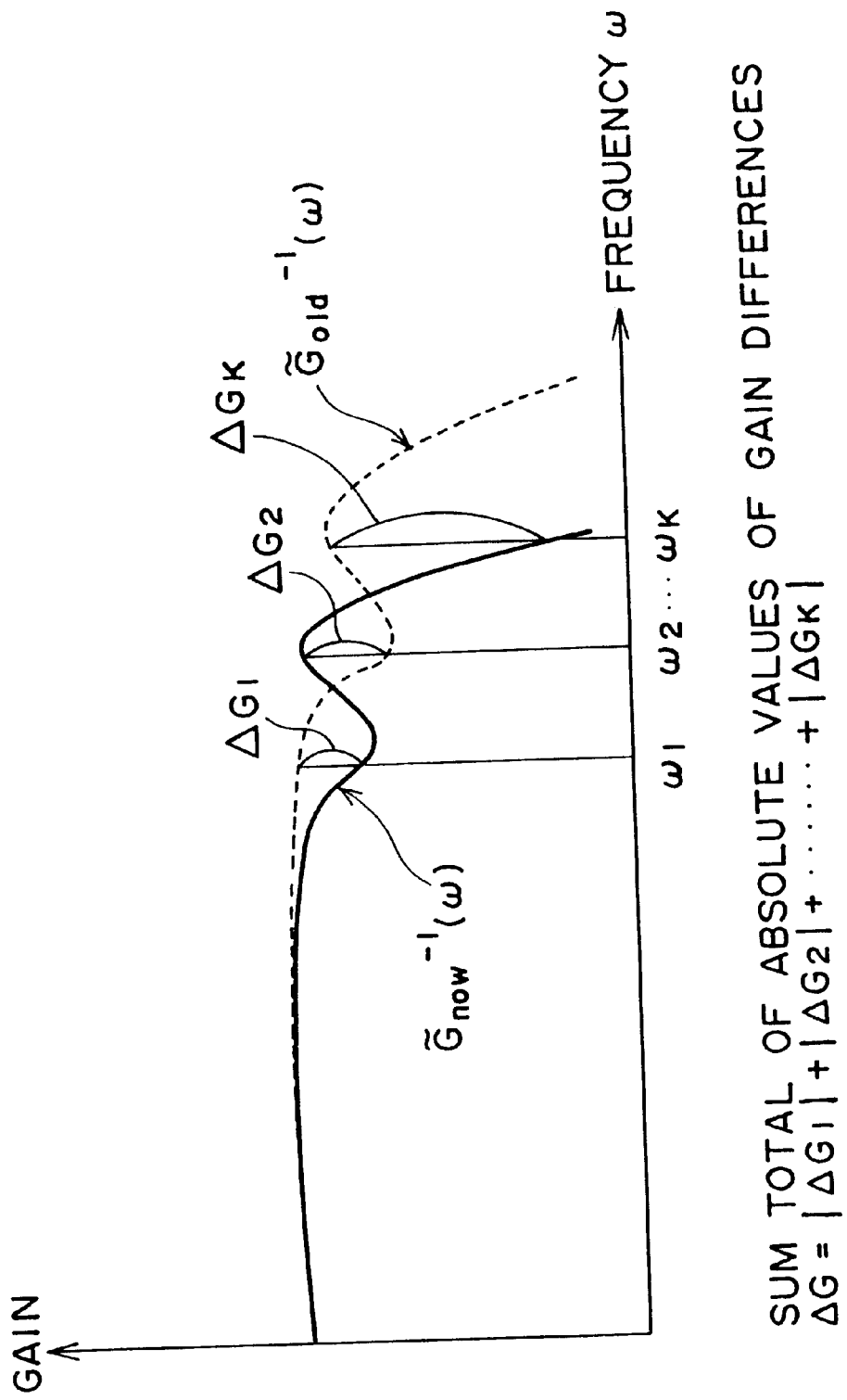
FIG. 8 is a figure for explaining the sum total of absolute values of the gain differences.

FIG. 8 is a figure for explaining the above described sum total of absolute values of the gain differences. In FIG. 8, the dotted line and the thick line express the estimated value $\tilde{G}_{old}^{-1}(\omega)$ of the inverse characteristic of the above described present excitation wave and the estimated value $\tilde{G}_{now}^{-1}(\omega)$ of the above described determined inverse characteristic, respectively. Furthermore, $\omega_1, \omega_2, \ldots \omega_K$ express the above described K pieces of frequency values, and $\Delta G_1, \Delta G_2, \ldots \Delta G_K$ express differences between the estimated values $\tilde{G}_{old}^{-1}(\omega)$ and the estimated values $\tilde{G}_{now}^{-1}(\omega)$ at those frequencies. Here, the above described sum total of absolute values of the gain differences is the value of $\Delta G$ determined by the following expression (7) described in FIG. 8.

$$\Delta G = |\Delta G_1| + |\Delta G_2| + \ldots + |\Delta G_K| \quad (7)$$

The internal configuration of the switching time setting unit 10 is as shown in FIG. 6, and the estimated value $\tilde{G}_{now}^{-1}(\omega)$ of the inverse characteristic sent from the vibrating table inverse characteristic calculator 4 is recorded in either of the recorders 102, 103 through the switching unit 101. In the other recorder, the estimated value $\tilde{G}_{old}^{-1}(\omega)$ of the inverse characteristic of the present compensation wave is recorded. In the gain difference calculators 1041 to 104K, the gain differences between the estimated values $\tilde{G}_{now}^{-1}(\omega)$ and the estimated values $\tilde{G}_{old}^{-1}(\omega)$ recorded in the recorders 102, 103 at the above described K pieces of frequency values are calculated, and the absolute values of the result are calculated in absolute value computing units 1051 to 105K, and after that, they are summed by an adder 106. The sum total $\Delta G$ of the gain differences is compared in a comparator 107 with a value Gs determined by a specific gain setting unit 108, and as mentioned above, a switching operation signal 12 is generated when $\Delta G$ becomes larger. Each time a new estimated value 40 of the inverse characteristic is sent from the vibrating table inverse characteristic calculator 4, the switching unit 101 is switched, and the above described operation is repeated.

After a switching operation signal 12 has been generated, as described in the first embodiment, an on-line compensation wave 70 is created, and the switching of the compensation wave is performed. As described above, in the second embodiment, similarly to the case of the first embodiment, by performing the on-line compensation, it is possible to make the target wave and the reproduced wave coincide with each other by one excitation, but there is a characteristic in that the timing of performing the on-line compensation is determined by the amount of change of the gain of the inverse characteristic. More particularly, each time the change becomes larger, switching to a new compensation wave is performed. Accordingly, in the waveform control unit according to the present embodiment, it is unnecessary to set the switching time of the compensation wave in advance before the main excitation, and it is effective in the case where it is difficult to estimate the switching time in advance. Furthermore, the actualization is also easy since the determination of the switching time is mainly performed only by the addition and subtraction of the gains.

Next a third embodiment of the present invention will be described. The present embodiment is a unit, wherein the output timing of a switching operation signal of the compensation wave is determined according to the amount of change $(\Delta \omega)$ of the eigenvalue (natural frequency) of the test piece detected from the inverse characteristic of the vibrating table, and it is different from the unit in the second embodiment only in the internal configuration of the switching time setting unit 10. Accordingly, the total block diagram of the waveform control unit in the present embodiment is the same as the block diagram of the second embodiment shown in FIG. 5, and further, the flow of the total processing is also a flow where $\Delta G$ is replaced by $\Delta \omega$ in the step S3-2 of the flow chart shown in FIG. 7.

Figure 9:
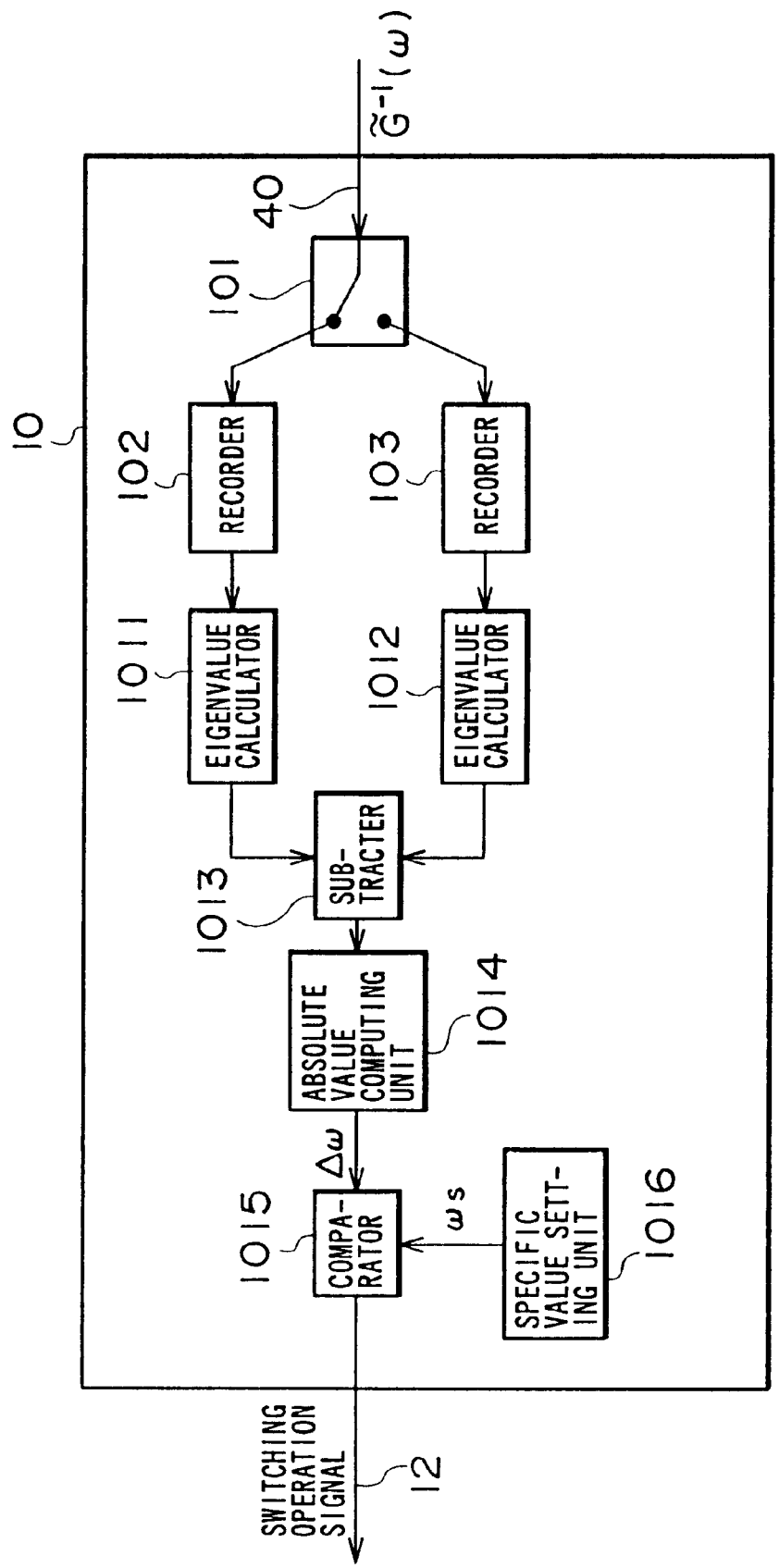
FIG. 9 is a block diagram of a switching time setting unit 10 according to a third embodiment.
Figure 12:
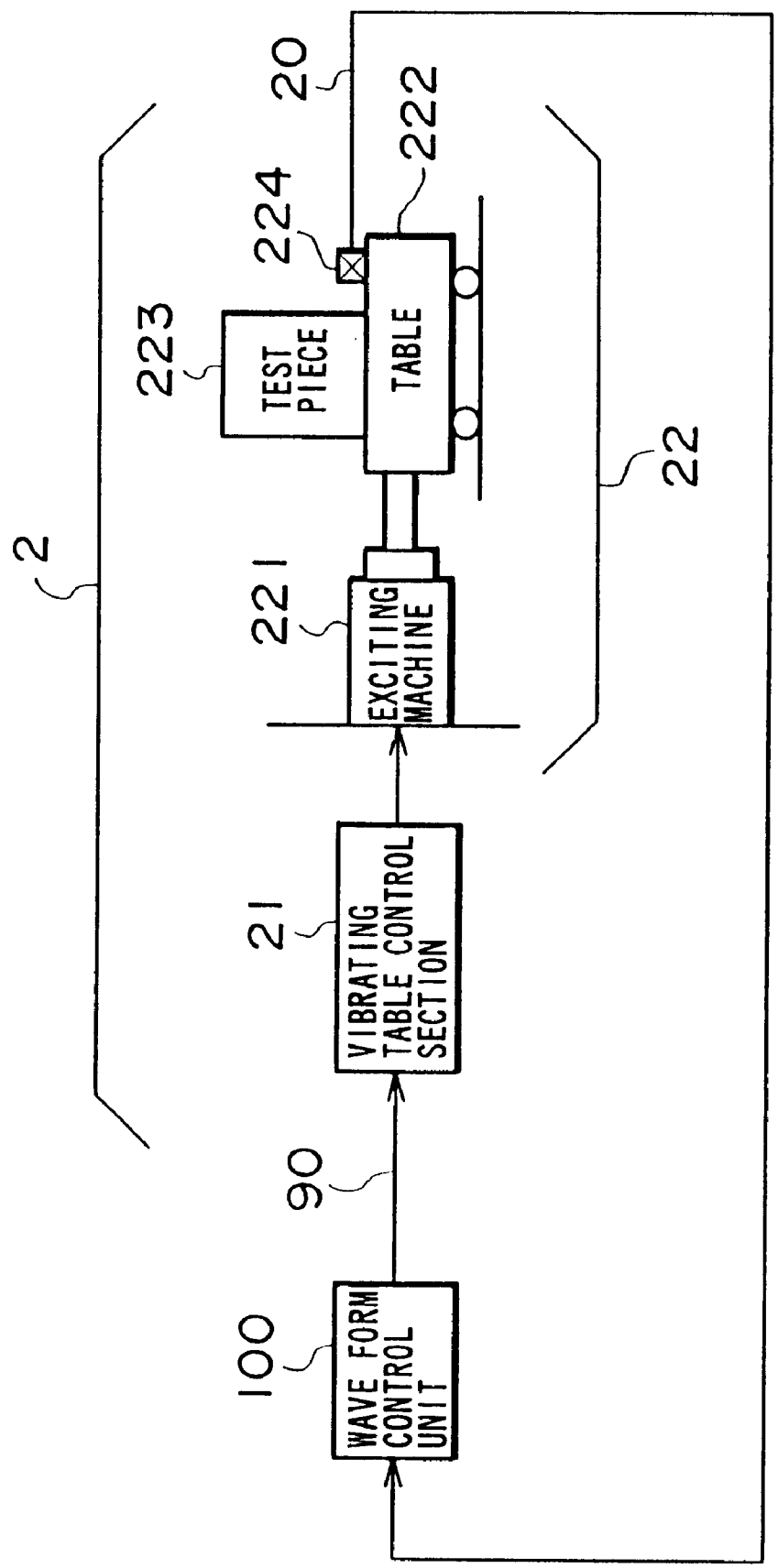
FIG. 12 is a figure showing the rough configuration of a vibrating unit.

FIG. 9 is a block diagram of the switching time setting unit 10 in the waveform control unit of the third embodiment. The characteristic parts in the third embodiment will be described below. In the present embodiment, the estimated value 40 of the inverse characteristic is also calculated in advance at all times in the vibrating table inverse characteristic calculator 4, and each time, that value is sent to the switching time setting unit 10. The sent estimated value $\tilde{G}_{now}^{-1}(\omega)$ of the inverse characteristic is recorded in either of the recorders 102, 103 through the switching unit 101 similarly to that in the case of the second embodiment.

In the other recorder, the estimated value $\tilde{G}_{old}^{-1}(\omega)$ of the inverse characteristic of the present compensation wave is recorded. Next, in the eigenvalue calculators 1011, 1012, the eigenvalues of the test piece in each case are calculated from the estimated values $\tilde{G}_{now}^{-1}(\omega)$ and $\tilde{G}_{now}^{-1}(\omega)$ of the inverse characteristic.

FIG. 10 is a figure showing the difference between an eigenvalue and an eigenvalue. In FIG. 10, the dotted line expresses the above described $\tilde{G}_{old}^{-1}(\omega)$, and the thick line expresses the above described $\tilde{G}_{now}^{-1}(\omega)$, and the eigenvalues (natural frequencies) of both are shown by $\omega_{Nold}$ and $\omega_{Nnow}$. Next, the absolute value ($\Delta\omega$ in FIG. 10) of a difference between two calculated eigenvalues is calculated by a subtracter 1013 and an absolute value computing unit 1014. The formula thereof is the following expression (8) as described in FIG. 10:

$$\Delta\omega = |\omega_{Nnow} - \omega_{Nold}| \tag{8}$$

The calculated difference $\Delta\omega$ of the eigenvalues is compared with a value $\omega$s set by a specific value setting unit 1016 in a comparator 1015, and in the case when it is larger than the set value $\omega$s, a switching operation signal 12 for renewing the estimated value of the inverse characteristic is outputted. Consequently, similarly to the cases of the first and second embodiments, an on-line compensation wave 70 is created, and the switching of the compensation wave is performed.

As described above, in the third embodiment, the inverse characteristic of the vibrating table is grasped at all times during the excitation, and in the case when the change of the eigen value of the test piece detected from that becomes a specific value or more, the on-line compensation is performed, so that the target wave and the reproduced wave may coincide with each other by one excitation. Furthermore, in this case, similarly to the second embodiment, it is unnecessary to perform the setting of the switching time in advance. Furthermore, by using the eigen value in the evaluation of the inverse characteristic for determining the switching time, it is possible to precisely grasp the change of the inverse characteristic of the vibrating table during the excitation, and a highly accurate evaluation is possible when compared with that of the second embodiment where the gains are merely compared.

Next, a fourth embodiment of the present invention will be described. The fourth embodiment is a unit in which an on-line compensation wave is created to switch the compensation wave at all times for each constant time during the excitation. Accordingly, the switching time setting unit 10 for indicating the switching time of the compensation wave is unnecessary, and therefore, the block diagram of the waveform control unit according to the fourth embodiment is a block diagram where the switching time setting unit 10 is omitted from the block diagram shown in FIG. 1 or FIG. 5.

In the waveform control unit of the present embodiment, the vibrating table inverse characteristic calculator 4, the on-line compensation wave generator 7, the adder 8 for each frequency, and the compensation wave switching unit 9 operate for each constant time, and each time, the switching of the compensation wave is performed by the created on-line compensation wave 70. The operation of each section is the same as the content described in the first embodiment. Furthermore, the flow of the total processing is also the same as the flow of the processing shown in FIG. 2, and the generation of a switching operation signal 12 (step S3) is performed for each constant time, and each time, the steps S4 to S8 in the figure are repeated.

In the waveform control unit according to the fourth embodiment, it is also possible to make the target wave and the reproduced wave coincide with each other by one excitation since the on-line compensation is performed at all times. Furthermore, by performing the switching of the compensation wave at comparatively short constant intervals, it can also be applied to a vibration test of a test piece whose characteristic gradually changes.

Next, a fifth embodiment of the present invention will be described. The present embodiment is a unit in which the acquisition term (above described $\Delta T$) of the data of an excitation wave and a reproduced wave used for grasping the inverse characteristic of the vibrating table is variable and the acquisition term $\Delta T$ at each time is set in advance. The present embodiment can be applied to all embodiments described until now.

FIG. 11 is a figure for explaining the above described acquisition term $\Delta T$ of the data in the fifth embodiment. FIG. 11(*a*) exemplifies the case where $\Delta T$ is constant. Furthermore, FIG. 11(*b*) and FIG. 11(*c*) show the frequency distributions of the data obtained at the times k, k' of FIG. 11(*a*), respectively. As apparent from the figure, the data (of the section 1 ($\Delta T1$) obtained at the time k contains a sufficient band, but the data (of the section 2 ($\Delta T2$)) obtained at the time k' does not contain the high band. Therefore, at the time k, the inverse characteristic can correctly be grasped, but at the time k', it cannot correctly be grasped. Thus, when $\Delta T$ is constant, there are some cases where the bias of the frequency component exists in the obtained data, which causes a problem in the calculation of the inverse characteristic.

In order to ensure a sufficient band in the data to be obtained, it is necessary to make $\Delta T$ long, but if $\Delta T$ is fixed to be long uniformly, a lot of old data may be contained in the data to be obtained, which is unpreferable for the on-line compensation. Accordingly, it is preferable to properly change $\Delta T$ if necessary.

FIG. 11(*d*) shows a case where the fifth embodiment is applied, and it shows a state where $\Delta T$ is made variable to the time ($\Delta T$ (k)) so that a proper data can also be obtained at the time k' in the example shown in FIG. 11(*a*). FIG. 11(*e*) expresses the frequency distribution of the data obtained in the section 3 in FIG. 11(*d*). The above described problem is solved by setting $\Delta T$ (k') to be longer than that in the case where $\Delta T$ is constant. Furthermore, since it is unnecessary to make $\Delta T$ (k) long at the time k, $\Delta T$ is left as it is.

Thus, it is desired to make $\Delta T$ variable, but it is difficult to determine a proper $\Delta T$ at each time in the real-time mode during the excitation. Therefore, in the present embodiment, attention is given to the fact that the target wave is known, and the frequency distribution of the target wave is analyzed before the excitation, and a proper $\Delta T$ at each time, that is, the shortest time including the data necessary for grasping the inverse characteristic is set in advance. Specifically, the acquisition term $\Delta T$ (t) whose value changes depending on the time t during the excitation is determined in advance. During the excitation, the data for $\Delta T$ (t) is obtained for each time t in the excitation wave recorder 5 and the reproduced wave recorder 6, and it is used for grasping the inverse characteristic.

As described above, in the fifth embodiment, at each time, the identification of the inverse characteristic is performed with a small bias of the frequency distribution and by a data of a short time, so that the accuracy of identification can be improved. Accordingly, a more accurate vibration test can be realized. As described above by using the first embodiment to fifth embodiment, the waveform control unit of a vibrating table to which the present invention is applied can make the target wave and the reproduced wave coincide with each other by one excitation, by performing the switching by using a proper on-line compensation wave during the excitation, and it can be applied to a so-called single shot breakdown test or the like.

The protection range of the present invention is not limited to the above described embodiments, but it extends to the inventions according to the claims and the equivalents thereof.

As described above according to the accompanying drawings, the present invention has the following effects:

First, there is such an effect that by switching the excitation wave during the excitation from an off-line compensation wave based on the inverse characteristic determined before the excitation to a compensation wave by an on-line compensation wave based on the inverse characteristic determined during the excitation, it becomes possible to make the target wave and the reproduced wave coincide with each other by one excitation and it is possible to be applied to a vibration test such as a so-called single shot breakdown test where the characteristic of the vibrating table changes during the excitation.

Secondly, it is possible to make the target wave and the reproduced wave coincide with each other more accurately by one excitation, by switching the excitation wave during the excitation by turns to a compensation wave by a new on-line compensation wave generated in turn during the excitation.

Thirdly, it is possible to create a compensation wave with a small error in any frequency domain, by making the compensation wave by an on-line compensation wave to be switched as the excitation wave be a mixed compensation wave made by adding an off-line compensation wave and an on-line compensation wave at a rate corresponding to the frequency.

Fourthly, there is such an effect that a more proper vibration test can be performed by smoothly switching the new and old compensation waves to be used as excitation waves when switching the excitation waves.

Fifthly, a proper switching of excitation waves is possible by performing the switching of excitation waves at a timing set in advance.

Sixthly, there is such an effect that it is possible to be applied to a vibration test of a test piece whose characteristic changes gradually, by performing the switching of excitation waves for each constant time during the excitation.

Seventhly, by performing the switching of excitation waves when the amount of change of the gain of the inverse characteristic grasped during the excitation becomes larger than a specific value, it is unnecessary to set the switching timing in advance before the excitation, and it is effective in the case where it is difficult to estimate the switching timing in advance.

Eighthly, by performing the switching of excitation waves when the amount of change of the eigenvalue of a test piece detected during the excitation becomes larger than a specific value, it is unnecessary to set the switching timing in advance before the excitation, and further, a more accurate vibration test is possible.

Ninthly, there is such an effect that by setting in advance the acquisition term of the data of an excitation wave and a reproduced wave used for grasping the inverse characteristic of a vibrating table at a proper length for each time, the identification of the inverse characteristic is performed with a small bias of the frequency distribution and by a data of a short time at each time during the excitation and the accuracy of identification is improved, Tenthly, there is such an effect that by using a vibrating unit having a waveform control unit of a vibrating table in which the on-line compensation can be performed, it becomes possible to perform a vibration test such as a so-called single shot breakdown test where the characteristic of the vibrating table changes during the excitation.

What is claimed is:

1. A waveform control unit of a vibrating table, which gives such a signal of an excitation wave that a reproduced wave reproduced in a vibrating table during an excitation may coincide with a target wave, to said vibrating table, comprising:

an off-line compensation wave generator which generates an off-line compensation wave to be used as said excitation wave, on the basis of said target wave and a inverse characteristic of said vibrating table determined before said excitation is performed; and an on-line compensation wave generator which generates an on-line compensation wave to be said excitation wave on the basis of the inverse characteristic of said vibrating table during said excitation determined on the basis of said target wave and data of said excitation wave and said reproduced wave for a specific time during said excitation, wherein said excitation wave to be given to said vibrating table is switched during said excitation to a compensation wave based on said on-line compensation wave from said off-line compensation wave.

2. The waveform control unit of a vibrating table according to claim 1, wherein said on-line compensation wave generator generates new on-line compensation waves by turns during said excitation, and wherein switching to the compensation wave based on the on-line compensation wave of said excitation wave is performed by turns on the basis of said newly generated on-line compensation wave.

3. The waveform control unit of a vibrating table according to claim 1, further comprising an adder for each frequency which adds said off-line compensation wave and said on-line compensation wave at a specific rate corresponding to the frequency and generates such a mixed compensation wave as to be said off-line compensation wave in a low frequency domain and to be said on-line compensation wave in a high frequency domain, wherein the compensation wave based on said on-line compensation wave is said mixed compensation wave.

4. The waveform control unit of a vibrating table according to claim 1, further comprising a compensation wave switching unit which adds a compensation wave becoming said excitation wave before switching and a compensation wave to be said excitation wave after switching at a specific rate corresponding to the time after switching and generates said excitation wave after switching, so that said excitation wave may smoothly be shifted to the waveform after switching from the waveform before switching at the time of switching of said excitation.

5. The waveform control unit of a vibrating table according to claim 1, wherein switching of said excitation wave is performed at a timing set in advance before said excitation.

6. The waveform control unit of a vibrating table according to claim 1, wherein switching of said excitation wave is performed for each constant time during said excitation.

7. The waveform control unit of a vibrating table according to claim 1, wherein switching of said excitation wave is performed, when a gain difference between the newest inverse characteristic of the vibrating table during said excitation and the inverse characteristic of said vibrating table used for generating the compensation wave becoming said excitation wave at that moment exceeds a specific value.

8. The waveform control unit of a vibrating table according to claim 1, wherein switching if said excitation wave is performed, when a difference between eigenvalues of each test piece mounted on said vibrating table determined respectively from the newest inverse characteristic of the vibrating table during said excitation and the inverse characteristic of said vibrating table used for generating the compensation wave becoming said excitation wave at that moment exceeds a specific value.

9. The waveform control unit of a vibrating table according to claim 1, wherein said specific time when data of said excitation wave and said reproduced wave used for determining said inverse characteristic of the vibrating table during the excitation is obtained is set in advance at such a time when data with no bias in the frequency component can be obtained for each time during said excitation.

10. A vibrating unit which comprises: a vibrating table where a test piece of a body to be tested is mounted and said test piece is vibrated by a specific waveform; and a waveform control unit of said vibrating table, wherein
the waveform control unit of said vibrating table is a waveform control unit of a vibrating table according to claim 1.

11. A waveform control method of a vibrating table which vibrates by receiving such a signal of an excitation wave as to make a reproduced wave coincide with a target wave during an excitation, comprising:
a first step of generating an off-line compensation wave to be said excitation wave, on the basis of the inverse characteristic of said vibrating table determined before said excitation is performed and said target wave, so that said excitation wave may be said off-line compensation wave; and
a second step of generating an on-line compensation wave to be said excitation wave, on the basis of the inverse characteristic of said vibrating table during said excitation determined on the basis of data of said excitation wave and said reproduced wave for a specific time during said excitation-and said target wave so that said excitation wave may be switched to a compensation wave based on said on-line compensation wave, during said excitation.

12. The waveform control method of a vibrating table according to claim 11, wherein said second step is furthermore repeatedly performed during said excitation.

13. The waveform control method of a vibrating table according to claim 11, wherein the compensation wave based on said on-line compensation wave in said second step is a mixed compensation wave which becomes said off-line compensation wave in a low frequency domain and becomes said on-line compensation wave in a high frequency domain by adding said off-line compensation wave and said on-line compensation wave at a specific rate corresponding to the frequency.

14. The waveform control method,of a vibrating table according to claim 11, wherein the excitation wave after switching in said second step is generated by adding a compensation wave becoming said excitation wave before switching and a compensation wave to be said excitation wave after switching at a specific rate corresponding to the time after switching, and has a waveform which can smoothly be shifted to the waveform after switching from the waveform before switching.

15. The waveform control method of a vibrating table according to claim 11, wherein said second step is performed at a timing set in advance before said excitation.

16. The waveform control method of a vibrating table according to claim 11, wherein said second step is performed for each constant time during said excitation.

17. The waveform control method of a vibrating table according to claim 11, wherein said second step is performed, when a gain difference between the newest inverse characteristic of the vibrating table during said excitation and the inverse characteristic of said vibrating table used for generating the compensation wave becoming said excitation wave at that moment exceeds a specific value.

18. The waveform control method of a vibrating table according to claim 11, wherein said second step is performed, when a difference between eigenvalues of each test piece mounted on said vibrating table determined respectively from the newest inverse characteristic of the vibrating table during said excitation and the inverse characteristic of said vibrating table used for generating the compensation wave becoming said excitation wave at that moment exceeds a specific value.

19. The waveform control method of a vibrating table according to claim 11, wherein said specific time when data of said excitation wave and said reproduced wave is obtained in said second step is set in advance at such a time when data with no bias in the frequency component can be obtained for each time during said excitation.

* * * * *